United States Patent

Shibata et al.

[15] 3,649,181
[45] Mar. 14, 1972

[54] PROCESS FOR PRODUCTION OF SODIUM SULFITE

[72] Inventors: Hiroshi Shibata; Tomijiro Morita, both of Iwaki-shi, Japan

[73] Assignee: Kureha Kagaku Kogyo Kabushiki Kaisha, Tokyo-to, Japan

[22] Filed: Dec. 16, 1969

[21] Appl. No.: 885,493

[30] Foreign Application Priority Data

Dec. 18, 1968 Japan.....................43/92816

[52] U.S. Cl..............................23/129, 23/177
[51] Int. Cl.............................C01d 5/14, C01d 5/00
[58] Field of Search ................23/129, 119, 178, 177

[56] References Cited

UNITED STATES PATENTS

| | | | |
|---|---|---|---|
| 1,023,179 | 4/1912 | Strickler | 23/129 |
| 1,826,028 | 10/1931 | Schroeder | 23/129 |
| 2,080,528 | 5/1937 | Bowman et al. | 23/129 |
| 2,161,056 | 6/1939 | Johnstone et al. | 23/178 |
| 3,305,307 | 2/1967 | Spormann et al. | 23/129 |
| 3,438,722 | 4/1969 | Heredy et al. | 23/129 X |
| 3,508,868 | 4/1970 | Kiyoura | 23/119 |

Primary Examiner—Edward Stern
Attorney—Wenderoth, Lind & Ponack

[57] ABSTRACT

Production of anhydrous sodium sulfite by contact reaction between combustion exhaust gas containing a small amount of sulfurous acid gas with sodium sulfite containing solution.

2 Claims, 1 Drawing Figure

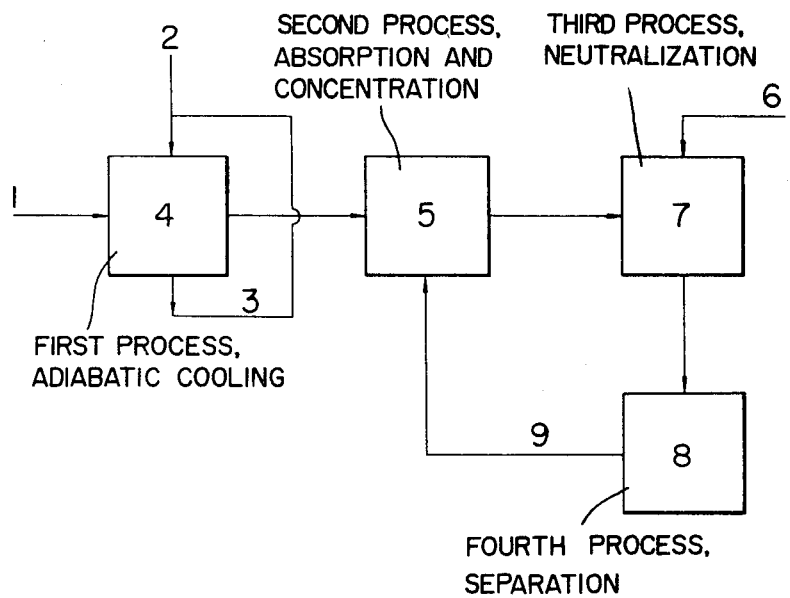

PROCESS FOR PRODUCTION OF SODIUM SULFITE

BACKGROUND OF THE INVENTION

This invention relates to a process for the production of anhydrous sodium sulfite by employing a gas containing a very small amount of sulfurous acid gas, such as exhaust gas discharged from thermal electric power plants.

The yield of caustic soda produced by mercury process electrolysis is generally about 50 percent, and in the case when sodium sulfite is produced by causing caustic soda to absorb $SO_2$, water is produced as a byproduct as represented by the following equation.

$$2NaOH + SO_2 \rightarrow Na_2SO_3 + H_2O$$

Accordingly, when sodium sulfite is desired in a solid form, evaporation of the water in the caustic soda and the produced water is required, whereby a great amount of thermal energy is necessary in this production process.

We have formerly proposed a process for the production of anhydrous sodium sulfite from caustic soda (NaOH) solution by utilizing the thermal energy of a roasted gas (Japanese Patent Publication No. 2251/1967).

However, in a gas having a low $SO_2$ concentration such as exhaust gas of a thermal electric power plant, since its gas quantity is very great with respect to that of $SO_2$, the removal of the dust contained therein by a Cottrell or the like is required. Thus, the cost of the equipment for embodying the production process becomes enormous. Furthermore, since the dust includes other substances which must not be mixed with sodium sulfite product, such as vanadium, a process of the character set forth in the above-mentioned Japanese Patent Publication could not be advantageously applied.

SUMMARY OF THE INVENTION

It is an object of the present invention to overcome the above-mentioned difficulties by providing a process for advantageously producing anhydrous sodium sulfite from a combustion exhaust gas containing $SO_2$ in a very low concentration of 0.05–1 percent, such as exhaust gas discharged from thermal electric power plants.

As a result of our studies relating to the instant problem, we have discovered that the above object and other objects of the invention can be achieved by utilizing our finding that by subjecting an exhaust gas to adiabatic cooling to a temperature of from 65° to 100° C. by washing with water while adjusting the quantity of the water to be supplied, and using the gas thus cooled for absorption of sulfurous acid gas in an absorption column, ample concentration of the reaction solution can be carried out in the absorption column.

According to the present invention, therefore, there is provided a process comprising the steps of cooling an exhaust gas with water of a certain limited quantity directly to an intermediate temperature, increasing its humidity to a certain extent at the same time, and then cooling this exhaust gas at the intermediate temperature with a caustic soda solution, whereby sulfurous acid gas is absorbed into the caustic soda, and, simultaneously, the reaction solution is concentrated.

This process is particularly effective in the case where a combustion exhaust gas of a high temperature containing sulfurous acid gas of a concentration of 1 percent or less is employed.

Accordingly, the process is unsuitable for application to a gas containing $SO_2$ gas of a high concentration as employed in the process of the above-mentioned Japanese Patent Publication because it is difficult to balance a large quantity of the water derived from the caustic soda used and sodium sulfite produced with evaporated water at the time of its reaction.

Furthermore, in the case where the content of sulfurous acid in an exhaust gas is excessively low, the quantity of sodium sulfite produced becomes small, and it is meaningless to thereby produce anhydrous sodium sulfite industrially. Accordingly, it is necessary that the concentration of sulfurous acid gas be 0.01 percent or above, preferably 0.05 percent or above.

The nature, principle, details, and utility of the invention will be more clearly apparent from the following detailed description beginning with general considerations and concluding with a specific example of practice constituting a preferred embodiment of the invention when read in conjunction with the accompanying drawing.

BRIEF DESCRIPTION OF THE DRAWING

In the drawing, the single FIGURE is a flow chart illustrating a process for producing sodium sulfite according to the present invention.

DETAILED DESCRIPTION OF THE INVENTION

The present invention will be described hereinbelow in connection with the accompanying drawing in which the process of the production of anhydrous sodium sulfite is carried out through the following process steps whereby a combustion exhaust gas 1 at a high temperature containing from 0.05 to 1% of $SO_2$ is subjected to adiabatic cooling by washing with added water 2 or circulated water 3 to a temperature of from 65° to 100° C. (first process 4). The exhaust gas thus washed with water in the first process is caused to contact an alkaline mixed solution containing a sodium salt selected from the group consisting of sodium hydroxide, sodium sulfite, sodium carbonate, and acid sodium sulfite to absorb the sulfur oxide gas in the exhaust gas, and, at the same time, concentration of its reaction solution is carried out (second process 5). The concentrated reaction solution obtained in the second process is neutralized with a caustic soda or sodium carbonate solution 6 to produce anhydrous sodium sulfite crystals (third process 7). The anhydrous sodium sulfite crystals thus produced are separated from the neutralized solution (fourth process 8). The sodium sulfite solution separated from the crystals in the fourth process is circulated to the second process through a pipeline 9.

In these process steps, a mother liquor separated from the sodium sulfite crystals and supplied from the fourth process into the second process is an alkaline solution having a pH value of from 8 to 13, and in the fourth process, one part or most of the absorption solution of sulfurous acid gas can be subjected to self-circulation in the process. In this case, the solution to contact the exhaust gas washed with water may have a pH value corresponding to from neutrality to weak acidity, but a pH value of 5.5 or less is undesirable because the absorption of sulfurous acid gas will decrease at these low pH values.

EXAMPLE

An exhaust gas of a thermal electric power plant at a temperature of 170° C. and of a composition by volume of 0.15 percent of $SO_2$, 12% of $CO_2$, and 15 percent of water was drawn at a rate of 250 m.³ per hour and the gas thus drawn was subjected to crossflow contact with sprayed water and water sprinkled onto a grid in a dust removing and cooling section. Thus, the gas was cooled to a temperature of 80° C., and soot, vanadium, and the like were almost completely removed therefrom. In this process, water in the gas increased from 0.177 kg. (15 percent by volume) to 0.250 kg. per 1 kg. of the dry gas.

From this gas, $SO_2$ was absorbed in an absorption column (ordinary packed column) with the use of 35 kg. of an absorption solution containing 20% of $Na_2SO_3$ in a manner such that the pH value of the solution became 6.5 at the outlet of the column. The composition of the solution in this case was 15% of $Na_2SO_3$, 8% of $NaHSO_3$, and the remainder of water, and there was no production of $Na_2CO_3$.

The gas at the outlet of the $SO_2$ absorption column was at a temperature of 62° C., a relative humidity of 95 percent, and a moisture content of 0.267 kg. per 1 kg. of dry gas, and the a quantity of water evaporation of the absorption solution in the absorption column was 3.5 kg.

Furthermore, 2.1 kg. of 50% NaOH solution was added to the absorption solution to separate crystals to a temperature of 80° C., and the resultant batch was filtered and dried, whereupon 3.2 kg. of anhydrous $Na_2SO_3$ of a purity of 97.3 percent was obtained.

In this case, the total quantity of water was 1.52 kg. consisting of 1.05 kg. of water brought in with NaOH and 0.47 kg. of water produced by neutralization, and, accordingly, the quantity of water calculated by the following equation was further lost by evaporation.

$$3.5 - 1.52 = 1.98 \text{ kg.}$$

Therefore, the same quantity of water as mentioned above was added to the filtrate and was again circulated to the absorption column for further use.

We claim:

1. A process for producing anhydrous sodium sulfite which comprises adiabatically cooling a high-temperature combustion exhaust gas containing less than 1 percent sulfurous acid gas with water to a temperature of from 65° to 100° C., contacting the cooled exhaust gas with a member selected from the group consisting of sodium sulfite aqueous solutions and alkaline mixed solutions containing sodium sulfite to absorb the sulfurous acid gas and simultaneously concentrate the reaction solution, neutralizing the reaction solution with a member selected from the group consisting of sodium hydroxide and sodium carbonate solutions to obtain anhydrous sodium sulfite crystals, separating the crystals from the solution and circulating the resultant neutralized solution, from which the crystals have been separated, for the absorption of sulfurous acid gas.

2. The process according to claim 1, wherein the alkaline mixed solution contains at least one member selected from the group consisting of sodium hydroxide, sodium carbonate and acid sodium sulfite.

* * * * *